(12) United States Patent
Grubis et al.

(10) Patent No.: US 9,473,351 B2
(45) Date of Patent: Oct. 18, 2016

(54) SYSTEM AND METHOD FOR AUTOMATED PROVISIONING OF A WIRELESS DEVICE

(71) Applicant: General Electric Company, Schenectady, NY (US)

(72) Inventors: Matthew George Grubis, New Berlin, WI (US); Kedar Valmik Kekan, Bangalore (IN); Matthew Richard Pekarske, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 571 days.

(21) Appl. No.: 13/855,198

(22) Filed: Apr. 2, 2013

(65) Prior Publication Data

US 2014/0297820 A1 Oct. 2, 2014

(51) Int. Cl.
*G06F 15/177* (2006.01)
*H04L 12/24* (2006.01)
*H04L 29/06* (2006.01)
*H04W 12/02* (2009.01)
*H04W 12/08* (2009.01)

(52) U.S. Cl.
CPC ....... *H04L 41/0806* (2013.01); *H04L 41/0886* (2013.01); *H04L 63/205* (2013.01); *H04W 12/02* (2013.01); *H04W 12/08* (2013.01)

(58) Field of Classification Search
CPC .... H04L 41/108–41/082; H04W 12/00–12/08
See application file for complete search history.

(56) References Cited

U.S. PATENT DOCUMENTS

| | | | |
|---|---|---|---|
| 8,356,087 B1 * | 1/2013 | Miller et al. | 709/220 |
| 2002/0018456 A1 * | 2/2002 | Kakemizu | H04L 12/4675 370/338 |
| 2002/0112076 A1 * | 8/2002 | Rueda | H04L 12/14 709/245 |
| 2003/0172307 A1 * | 9/2003 | Henry et al. | 713/201 |
| 2004/0205188 A1 * | 10/2004 | Ahlard | H04L 12/1854 709/224 |
| 2005/0135269 A1 * | 6/2005 | Saint-Hilaire et al. | 370/254 |
| 2005/0273853 A1 * | 12/2005 | Oba | H04L 41/28 726/22 |
| 2006/0031436 A1 * | 2/2006 | Sakata | H04L 12/14 709/221 |

(Continued)

FOREIGN PATENT DOCUMENTS

EP 2645778 A1 * 10/2013

OTHER PUBLICATIONS

Droms R Et. Al.: Authentication for DHCP Messages: rfc3118.txt, Jun. 1, 2001, XP015008899, ISSN: 0000-0003.

(Continued)

*Primary Examiner* — Brendan Higa
(74) *Attorney, Agent, or Firm* — GE Global Patent Operation; Marc A. Vivenzio

(57) ABSTRACT

A processor and a system for automated provisioning of one or more wireless devices are provided. The processor includes one or more processing subsystems communicably coupled to a guest network. The one or more processing subsystems receive one or more input data signals corresponding to a service request from the wireless devices to connect to a secured backend network. The input data signals include a plurality of service connection parameters associated with the wireless devices. The service connection parameters are then authenticated with pre-stored data. Thereafter the input data signals are processed upon authentication to establish a secured communication link with the wireless devices. Subsequently a plurality of output signals corresponding to the service request to the wireless devices for automated provisioning to establish a connection with the secured backend network.

17 Claims, 11 Drawing Sheets

(56) References Cited

U.S. PATENT DOCUMENTS

| | | | | |
|---|---|---|---|---|
| 2006/0070115 A1* | 3/2006 | Yamada | ........... | H04L 63/164 |
| | | | | 726/3 |
| 2006/0184998 A1* | 8/2006 | Smith et al. | ........... | 726/3 |
| 2006/0190991 A1* | 8/2006 | Iyer | ........... | H04L 63/083 |
| | | | | 726/3 |
| 2006/0274774 A1* | 12/2006 | Srinivasan | ........... | H04L 41/0809 |
| | | | | 370/420 |
| 2007/0234418 A1* | 10/2007 | Song et al. | ........... | 726/15 |
| 2009/0217346 A1* | 8/2009 | Manring | ........... | H04L 61/2015 |
| | | | | 726/1 |
| 2010/0042701 A1* | 2/2010 | Cole | ........... | G06Q 10/083 |
| | | | | 709/217 |
| 2012/0257565 A1* | 10/2012 | Laroche | ........... | H04L 63/0272 |
| | | | | 370/328 |
| 2013/0191524 A1* | 7/2013 | Dupre | ........... | H04L 41/0213 |
| | | | | 709/223 |
| 2013/0309971 A1* | 11/2013 | Kiukkonen | ........... | H04L 63/107 |
| | | | | 455/41.2 |
| 2013/0318573 A1* | 11/2013 | Reunamaki | ........... | H04W 12/04 |
| | | | | 726/4 |
| 2014/0304689 A1* | 10/2014 | San Jose | ........... | G06F 8/30 |
| | | | | 717/134 |
| 2015/0012986 A1* | 1/2015 | Sun | ........... | H04W 12/06 |
| | | | | 726/6 |

OTHER PUBLICATIONS

Droms Bucknell University R: "Dynamic Host Configuration Protocol; rfc2131.txt", Mar. 1, 1997, XP015007915, ISSN: 0000-0003.
XpressConnect Simplifies WPA2 for Eastern Kentucky University, Copyright 2009, Cloudpath Networks Inc.
Fs-Flexconnect, Copyright 2011, Ruckus Wireless, Inc.
XpressConnect Enables Wireless Security Best Practice At Syracuse University, Copyright 2009, Couldpath Networks Inc.
European Search Report dated Jul. 26, 2013.

* cited by examiner

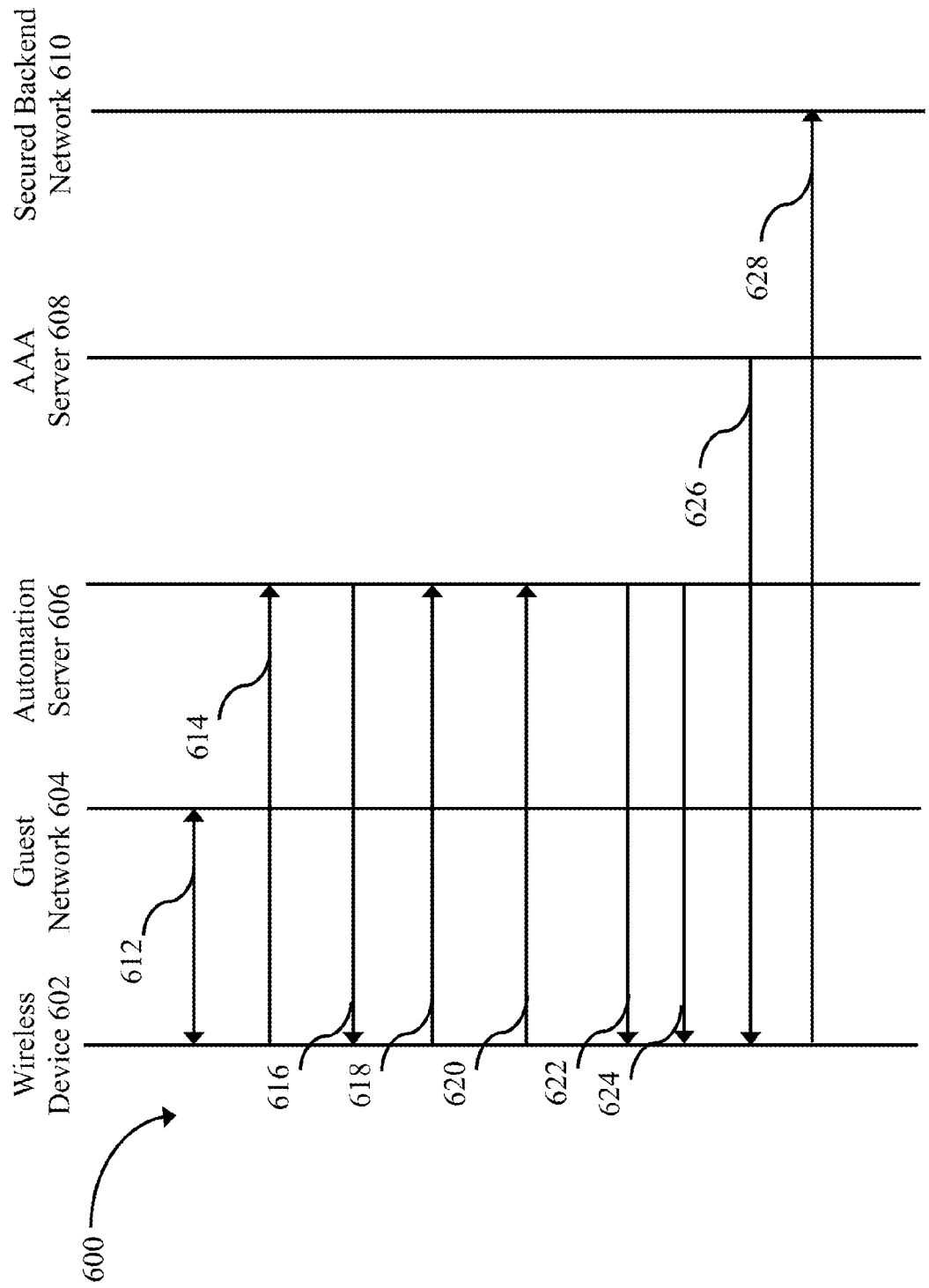

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Device Name  |  Unique device Key  |     Request type       |
+-+-+-+-+-+-+-+-+-+-+-+-+-+-+-+-+-+-+-+-+-+-+-+-+-+-+-+-+-+-+-+-+
| Packet Length |
+-+-+-+-+-+-+-+-+-+-+-+-+-+-+-+-+-+-+-+-+-+-+-+-+-+-+-+-+-+-+-+-+
| Device Serial # |       Device MAC add.                       |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Device Name  |  Unique device Key  |     Response type      |
+-+-+-+-+-+-+-+-+-+-+-+-+-+-+-+-+-+-+-+-+-+-+-+-+-+-+-+-+-+-+-+-+
| Packet Length |        Response ID                            |
+-+-+-+-+-+-+-+-+-+-+-+-+-+-+-+-+-+-+-+-+-+-+-+-+-+-+-+-+-+-+-+-+
```

FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Device Name   | Unique device Key |   Response type   |
+-+-+-+-+-+-+-+-+-+-+-+-+-+-+-+-+-+-+-+-+-+-+-+-+-+-+-+-+-+-+-+-+
| Packet Length   |           Response ID                 |
+-+-+-+-+-+-+-+-+-+-+-+-+-+-+-+-+-+-+-+-+-+-+-+-+-+-+-+-+-+-+-+-+
|   SSID          | Passphrase        |      Radio        |
+-+-+-+-+-+-+-+-+-+-+-+-+-+-+-+-+-+-+-+-+-+-+-+-+-+-+-+-+-+-+-+-+
| Security type   | QoS type          |      Rsvd         |
+-+-+-+-+-+-+-+-+-+-+-+-+-+-+-+-+-+-+-+-+-+-+-+-+-+-+-+-+-+-+-+-+
|               Radius Certificate                        |
+-+-+-+-+-+-+-+-+-+-+-+-+-+-+-+-+-+-+-+-+-+-+-+-+-+-+-+-+-+-+-+-+
|               QoS Parameters                            |
+-+-+-+-+-+-+-+-+-+-+-+-+-+-+-+-+-+-+-+-+-+-+-+-+-+-+-+-+-+-+-+-+
```

FIG. 11

SYSTEM AND METHOD FOR AUTOMATED PROVISIONING OF A WIRELESS DEVICE

BACKGROUND OF THE INVENTION

The subject matter disclosed herein relates to the provisioning of a wireless device and more specifically to a system and method for automated provisioning of a wireless device.

Provisioning involves preparing and equipping a network to provide new services to users of the network. Provisioning a device means preparing the device to access some services provided by a network in which the device operates. For example, a device entering a wireless network needs to be provisioned to use any service offered by the wireless network. A service may be, for example, accessing a database in the wireless network. In order to prepare the wireless device, a configuration file associated with a service offered by the wireless network may be installed in the wireless device. The configuration file includes settings information for configuring the wireless device to communicate with the wireless network for accessing the service. The settings information may include, network settings, security settings, etc. The configuration file may be manually installed into the wireless device by a network administrator. Thereafter, the wireless device is configured to access the services provided by the wireless network.

For example, when a wireless device moves from one location to another, the wireless device needs to connect with a server or a wireless network present in the current location. In order to use the services offered by the wireless network, the wireless device needs to receive configuration settings specific to a server and a network infrastructure in the location. The configuration settings are usually configured in the wireless device in the manual manner by a network administrator. The process of manually configuring the wireless device becomes cumbersome and time consuming. Therefore, there is a need for a system for provisioning a wireless device in an efficient manner.

The above-mentioned shortcomings, disadvantages and problems are addressed herein which will be understood by reading and understanding the following specification.

BRIEF DESCRIPTION OF THE INVENTION

In an embodiment of the invention, a processor is provided for automated provisioning of one or more wireless devices. The processor includes one or more processing subsystems communicably coupled to a guest network. The processing subsystems are configured to receive one or more input data signals corresponding to a service request from the wireless devices within the guest network. The service request may be to connect to a secured backend network. The input data signals include multiple service connection parameters associated with the wireless devices. The processing subsystems authenticate the multiple service connection parameters with pre-stored data in one or more memory. The input data signals are processed upon authentication to establish a secured communication link with the wireless devices. Thereafter multiple output signals corresponding to the service request are transferred to the wireless devices for automated provisioning to establish a connection with the secured backend network.

In another embodiment of the invention, a system is provided for automated provisioning. The system includes one or more wireless devices configured to transmit one or more output data signals corresponding to a service request within a guest network. The output data signals include multiple service connection parameters associated with the wireless devices. The system also includes a processing subsystem configured to receive the output data signals corresponding to the service request from the wireless devices to connect to a secured backend network. The processing subsystem authenticates the service connection parameters with a pre-stored data stored in one or more memory. The output data signals may be processed upon authentication to establish a secured communication link with the wireless devices. Subsequently multiple output signals corresponding to the service request are sent to the wireless devices for automated provisioning to establish a connection with the secured backend network.

In still another embodiment of the invention, a method of automated provisioning of one or more wireless devices is provided. The method involves receiving one or more input data signals corresponding to a service request from the wireless devices within a guest network to connect to a secured backend network. The input data signals includes multiple service connection parameters associated with these wireless devices. The service connection parameters are then authenticated with a pre-stored data. The input data signals are then processed upon authentication to establish a secured communication link between the wireless devices and one or more processing subsystems. Multiple output signals corresponding to the service request are then transferred to the wireless devices for automated provisioning to establish a connection with the secured backend network.

BRIEF DESCRIPTION OF THE DRAWINGS

Various features, objects, and advantages of embodiments of the invention will be made apparent to those skilled in the art from the accompanying drawings and detailed description thereof.

FIG. 6 illustrates a data flow diagram for automated provisioning of a wireless device in accordance with an embodiment;

FIG. 7 is a schematic illustration of a packet structure of a service request sent by a wireless device in accordance with an embodiment;

FIG. 8 is a schematic illustration of a packet structure of a service response (a positive response) sent by an automation server to the wireless device in accordance with an embodiment;

FIG. 11 is a schematic illustration of a packet structure of a probe response (a positive response) sent by the automation server to the wireless device in accordance with an embodiment;

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of embodiments of the invention.

As discussed in detail below, embodiments of the invention include a system and a method for automated provisioning of one or more wireless devices. The system includes one or more wireless devices within a guest network and a processing subsystem. The wireless devices transmit one or more output data signals corresponding to a service request within the guest network. The output data signals include multiple service connection parameters associated with the wireless devices. The processing subsystem receives the output data signals corresponding to the service request from the wireless devices. The service request may be for the wireless devices to connect to a secured backend network. The service connection parameters are authenticated with a pre-stored data stored in one or more memory. Once authenticated, the output data signals may be processed to establish a secured communication link with the wireless devices. Thereafter multiple output signals corresponding to the service request are sent to the wireless devices for provision the wireless devices in an automated manner. The wireless devices when provisioned establish a connection with the secured backend network.

Figure 1:
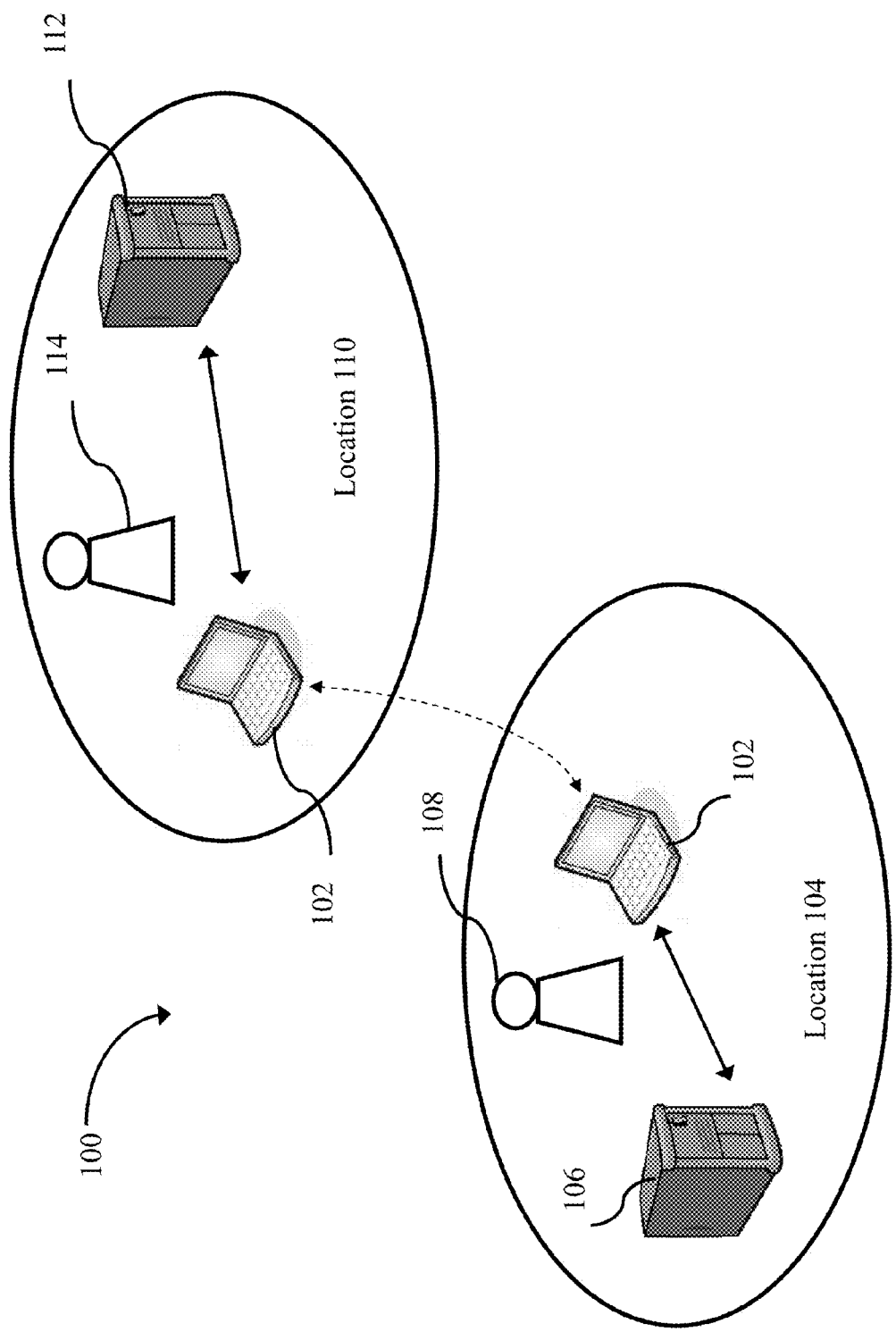
FIG. 1 is a schematic illustration of an exemplary environment where one or more embodiments of the invention may operate in accordance with an embodiment.

FIG. 1 is a schematic illustration of an exemplary environment 100 where one or more embodiments of the invention may operate in accordance with an embodiment. The environment 100 may include a client device 102 present in a location 104 communicably connected to a server 106. The client device 102 may have wireless or wired communication capability. The client device 102 may include but are not limited to, a computing device, a laptop and a mobile device. The server 106 may include but are not limited to a web server, a database server, a file server, a mail server and an application server. The client device 102 may be connected over a network to the server 106. The network is not illustrated in FIG. 1 for sake of convenience of illustration. The network may be a Wireless Local Area Network (WLAN), a Wireless Wide Area Network (Wireless WAN), Wireless Personal Area Network (Wireless PAN), a Wireless Metropolitan Area Network (Wireless MAN), a Wireless Telecommunication Network or any other wireless networks known in the art. The wireless network may use various wireless technologies such as but are not limited to, 802.11 WLAN, Bluetooth®, Zigbee® and a Wireless Medical Telemetry Service (WMTS).

The client device 102 may communicate with the server 106 for using any services provided by the server 106. The services may include for example, accessing a database in the network, accessing a network, accessing the web and accessing any applications etc. To communicate with the server 106, the client device 102 may need to be provisioned to access the server 106 within the network. The process of provisioning may involve installing a service configuration associated with the network in the client device 102 for setting the client device 102 to communicate with the server 106. The service configuration may include settings information for example but are not limited to application settings, network settings, security settings etc. The service configuration may be installed in the client device 102 by a network administrator 108. The client device 102 may move to a different location such as, a location 110 and may need to access a network present in the location 110. The network may be different as compared to the network present in the location 104. In this case as the client device 102 is already programmed or provisioned to operate in the location 104 the client device 102 may need to be re-provisioned to communicate with the network on location 110. The re-provisioning may be performed by installing a service configuration associated with the network in the location 110. The service configuration once installed enables the client device 102 to access the network and communicate with a server 112. The server 112 may be similar to the server 106 or any other server providing services to the client device 102. The service configuration may need to be installed in the client device 102 by a network administrator 114 in the location 110. Thus when the client device 102 moves from one location to another location the client device 102 may need to be manually provisioned each time to access different networks in different locations. The manual re-provisioning or provisioning of a client device may be laborious and time consuming. Hence the in accordance with one or more embodiments of the invention a processor and a system for automated provisioning of the one or more wireless devices and this system is described with respect to FIGS. 2 and 3.

Figure 2:
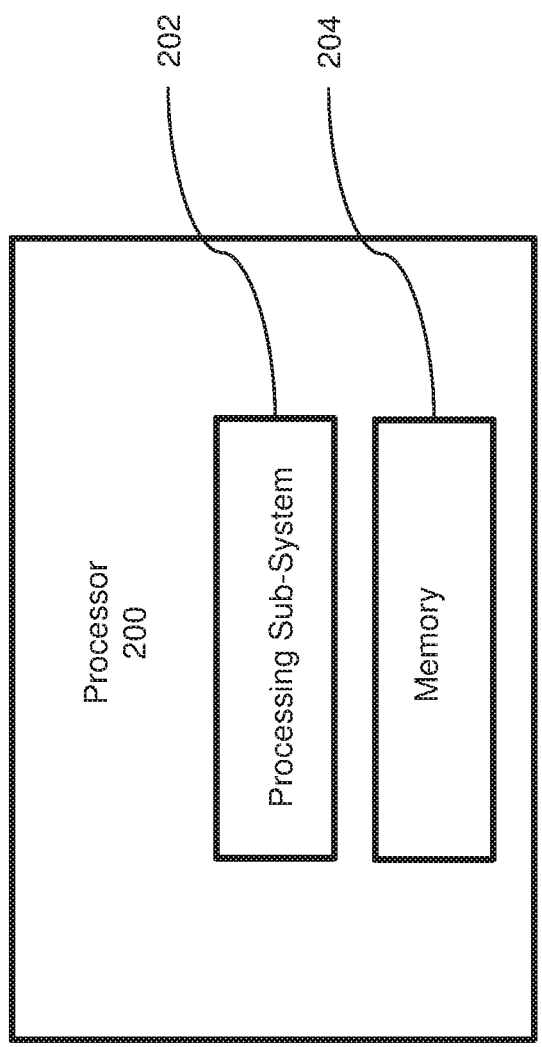
FIG. 2 is a schematic illustration of a processor for automated provisioning of one or more wireless devices in accordance with an embodiment.

FIG. 2 is a schematic illustration of a processor 200 for automated provisioning of one or more wireless devices in accordance with an embodiment. The processor 200 includes one or more processing subsystems such as, a processing subsystem 202. The processing subsystem 202 may be communicably coupled to a guest network (described in detail in conjunction with FIG. 5). The guest network includes the one or more wireless devices. Even though the wireless devices are referred as capable of communicating using a wireless connection, the wireless devices may also be capable of communicating through a wired connection. The guest network may be a temporary network that may be accessible to the wireless devices. In an embodiment the guest network may be capable of providing services for automated provisioning of the wireless devices. However the guest network may not provide other services such as, Internet, connectivity to any backend network. The processing subsystem 202 is configured to receive one or more input data signals corresponding to a service request from the wireless devices. An input data signal corresponds to a service request for connecting to a secured backend network. The secured backend network may be a network available based on request or subscription and not available for public. The secured backend network may include for example but are not limited to a hospital network, a bank network and a private network.

The input data signals include multiple service connection parameters associated with the wireless devices. The multiple service connection parameters may include one or more device identification parameters and a request type. The device identification parameters may be for example but not limited to a unique device identification key, a device serial number, and a device Media Access Control (MAC) Address. Further the request type indicates a service that the wireless device requires. The service request is for connecting the wireless device to the secured backend network. In an embodiment a service connection parameter may be length of an input data signal. The input data signals are further explained in detail in conjunction with FIGS. 2, 3 and 6. In an embodiment the input data signals may include one or more communication parameters associated with the wireless devices. A communication parameter may be associated with communication capability of a wireless device. For example a communication parameter may indicate a wireless communication capability of a wireless device. However the communication parameters may indicate any parameters related to communication capabilities of the wireless device.

The processing subsystem 202 then authenticates the service connection parameters with pre-stored data. The pre-stored data includes multiple device identification parameters associated with the wireless devices, and request types. The prestored data may be stored in one or more memory 204. The one or more memory may be of the processor 200. In an embodiment the one or more memory 204 may be external to the processor 200. For example, one or more service connection parameters received from a wireless device include unique device identification key, a device serial number, a communication parameter and a device MAC address associated with the wireless device. The service connection parameters may be compared with a multiple device identification parameters associated with each wireless device and request types to 254952-4 9 authenticate the wireless device. In case a wireless device is not found authentic then in an embodiment the processing subsystem 202 may mark this unauthorized access by flagging an input signal or a request received from the wireless device. Further in an embodiment the processing subsystem 202 may also mark multiple input signals or requests received from the wireless device. Such marked input signals may be notified to a network administration by the processing subsystem 202. Furthermore the processing subsystem 202 may also store the number of times the input signals or requests sent by wireless device.

Once the authentication is performed the processing subsystem 202 processes the input data signals to establish a secured communication link with the wireless devices. The secured communication link may be a wireless connection. The processing subsystem 202 may receive a probe request from the wireless devices. The probe request may include information associated with wireless capabilities of the wireless devices. This explained in detail in conjunction with FIG. 10. Thereafter multiple output signals corresponding to the service request is transferred to the wireless devices. The multiple output signals are transferred to automatically provision the wireless devices for establishing a connection with the secured backend network. The output signals includes one or more service configurations associated with the wireless devices. A service configuration needs to be installed in a wireless device for provisioning the wireless device for connecting to the secured backend network. The service configuration may include but are not limited to network settings, application settings, security settings, and Quality of Service (QoS) settings that enables the wireless device to connect to the secured back end network. The service configuration is transferred to the wireless device and this is automatically installed into the wireless device without any user or administrator intervention. Thereafter the wireless device establishes connection with the secured backend network.

In an embodiment of the invention, before transferring the service configurations, the processing subsystem 202 may be configured to determine whether the service configurations are compatible with the communication parameters associated with the wireless devices. The service configurations may be identified from multiple service configurations. The multiple service configurations may be pre-stored. In a scenario the processing subsystem 202 may be configured to notify the wireless devices whether the one or more service configurations are compatible with the communication parameters.

For example a communication parameter associated with a wireless device is initially received. The communication parameter indicates that the wireless device have a type of wireless communication capability. Then a service configuration may be selected from multiple service configurations. In order to select the service configuration, each service configuration is compared with the received communication parameter. Then the service configuration compatible with the communication parameter is selected. The selected service configuration may be for the wireless capable device having the type of wireless communication capability indicated by the communication parameter. Now in case none of the service configurations are found compatible with the communication parameter then this may be notified to the wireless device.

Figure 3:
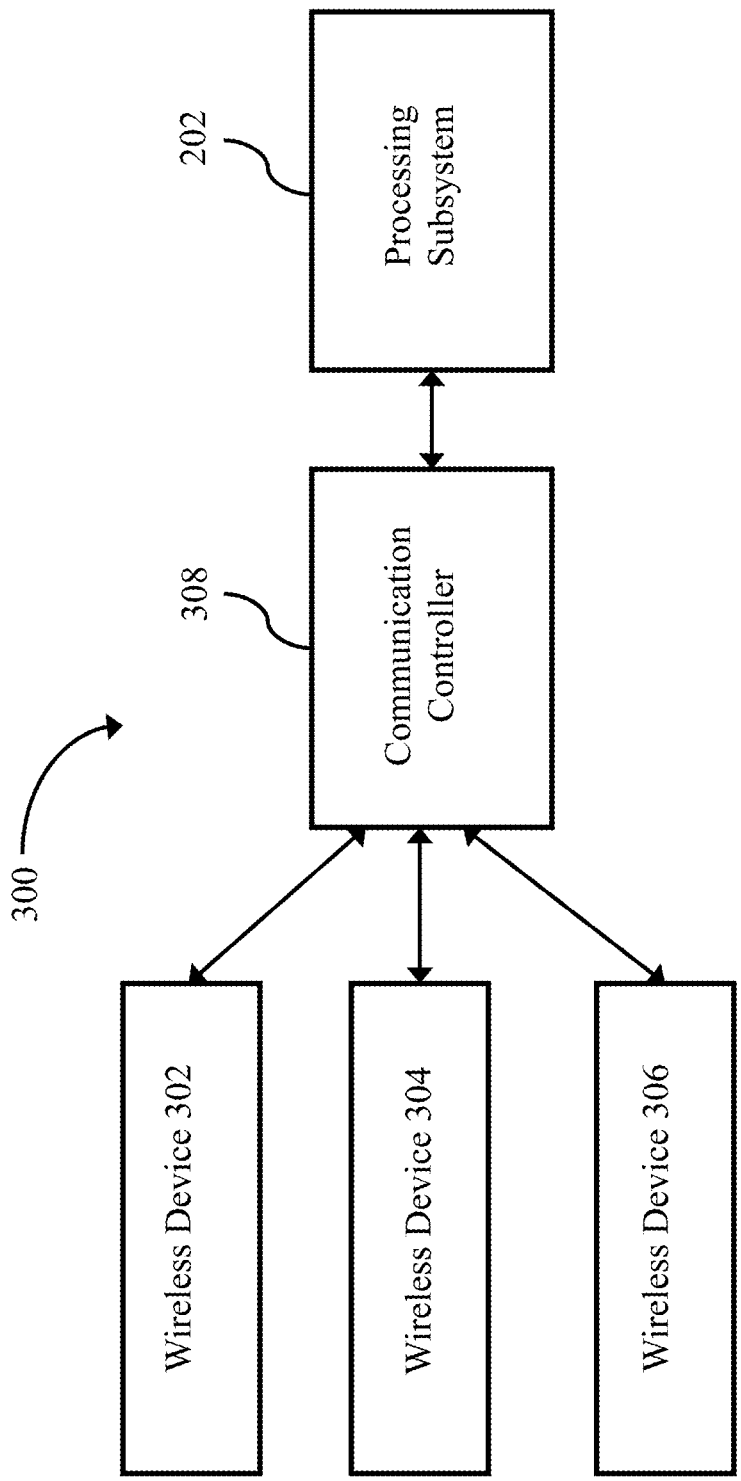
FIG. 3 is a schematic illustration of a system including a processing subsystem present in the processor of FIG. 2 for automated provisioning of one or more wireless devices in accordance with an embodiment.

FIG. 3 is a schematic illustration of a system 300 for automated provisioning of one or more wireless devices in accordance with an embodiment. The system 300 includes the processing subsystem 202 that automatically provisions the one or more wireless devices. The one or more wireless devices may include a wireless device 302, a wireless device 304 and a wireless device 306. These wireless devices may be similar to the one or more wireless devices explained in conjunction with FIG. 2. The number of wireless devices that are part of the system 300 may vary because a wireless device may be mobile and move from one location to another. The wireless devices are configured to transmit one or more output data signals corresponding to a service request to the processing subsystem 202. The output data signals may be transmitted over a guest network (not shown in FIG. 3 for sake of convenience of illustration). The guest network may be similar to the guest network already explained in conjunction with FIG. 2 and this will be further explained in detail in conjunction with FIG. 4. The output data signals include multiple service connection parameters associated with the wireless devices. These service connection parameters may include one or more device identification parameters and a request type. The device identification parameters may be for example but are not limited to a unique device identification key, a device serial number, and a device Media Access Control (MAC) Address. Further the request type indicates a service that the wireless device requires.

In an embodiment of the invention, the output data signals may include one or more communication parameters associated with the wireless devices. A communication parameter may be associated with communication capability of a wireless device. For example a communication parameter may indicate a wireless communication capability of a wireless device 302. However the one or more communication parameters may indicate any parameters related to communication capabilities of the wireless device 302. The output data signals are received by the processing subsystem 202. In order to receive the output data signals the wireless devices need to establish a connection with the processing subsystem 202. Explaining in another way the output data signals may be sent to the wireless devices only when the connection is established.

To this end, requests may be sent by the wireless devices to a communication controller 308 for connecting to the processing subsystem 202. The requests may be sent over the guest network. The communication controller 308 may be communicably connected to the processing subsystem 308. The connection between the communication controller 308 and the processing subsystem 202 may be a wired connection. The communication controller 308 receives and processes the request to establish a connection between the wireless devices and the processing subsystem 202. This connection may be established in such a way that all information communicated to the processing subsystem 202 by the wireless devices may be routed through the communication controller 308. Further the connection between the wireless devices and the communication controller 308 may be different from the connection between the communication controller 308 and the processing subsystem 202. Moreover the connection between the wireless devices and the communication controller 308 may be a wireless connection and the connection between the communication controller 308 and the processing subsystem 202 may be a wired connection. Thus the processing subsystem 202 may not be directly accessible to end users such as users of the wireless devices thereby mitigating security threats or security attacks of the processing subsystem 202.

In an embodiment the connection between the wireless devices and the processing subsystem 202 may be established using a Service Set Identification (SSID) associated with the guest network. The SSID may be but not limited to a generic SSID, an open SSID and a guest SSID. The communication controller 308 may assign one or more SSIDs to the wireless devices. In an embodiment the communication controller 308 may assign one or more generic SSIDs to the wireless devices. The communication controller 308 may be capable of hosting 32 Generic SSIDs in a network. The generic SSIDs may be protected by various security applications such as but not limited to, Wired Equivalent Privacy (WEP) and Wi-Fi® Protected Access (WPA) Pre-Shared Key (PSK). The information associated with the security applications of the generic SSID and the generic SSID may be pre-stored.

In an embodiment a generic SSID may be capable of providing automatic connection capability to the wireless devices for connecting to the guest network. For example, when a wireless device 302 enters a location the wireless device 302 may be able to automatically connect to the guest network using a generic SSID allocated by the communication controller 308. Thus in this location the wireless device 302 may monitor whether it is connected to a secured network. In case the wireless device 302 is not connected to the secured network then the wireless device 302 may use the generic SSID to connect to the guest network. The generic SSID may be allocated along with a pre-shared key for establishing the connection. The pre-shared key may not be known to a user of the wireless device 302.

In another embodiment the communication controller 308 may assign guest SSIDs to the wireless devices. A guest SSID may be allocated when a wireless device such as, a wireless device 302 enters the guest network. In this case the wireless device 302 may be considered as a guest to the guest network. The guest SSID may enable the wireless device 302 to automatically connect to the guest network and then finally to the processing subsystem 202. While using the guest SSID the wireless device 302 may prompt for any key or password to be entered for establishing the connection. The guest SSID may be re-used by any other wireless devices once the wireless device 302 currently using the guest SSID disconnects. Thus the guest SSID may provide other services such as, Internet to the wireless devices. The network infrastructure administrator may define whether the guest SSID can provide such services. In this case additional security provisions may be provided so that unauthorized access to the secured backend network is eliminated.

In yet another embodiment the wireless devices may be allocated one or more open SSIDs. In this case when a wireless device such as, a wireless device 302 enters the vicinity of the guest network the wireless device 302 may be connected to the guest network automatically without requiring a key or a password. Further it may be appreciated that the communication controller 308 may allocate a combination of different SSIDs such as a generic SSID, a guest SSID and an open SSID to the wireless device 302. For example the wireless device 302, the wireless device 304 and the wireless device 306 may be allocated a generic SSID, a guest SSID and an open SSID respectively.

When the connection is established between the wireless devices and the processing subsystem 202, the wireless devices may transmit the output data signals as discussed earlier. The processing subsystem 202 processes the output data signals associated with the service request for connecting to a secured backend network. The output data signals are processed by authenticating the multiple service connection parameters with pre-stored data. The pre-stored data may be present in one or more memory. The one or more memory may be part of the processing subsystem 308 or may be external to the processing subsystem 202. The pre-stored data includes multiple device identification parameters associated with multiple wireless devices, and request types. The pre-stored data may be stored in the one or more memory. For example, one or more service connection parameters received from a wireless device 302 may include unique device identification key, a device serial number, a communication parameter and a device MAC address. The one or more service connection parameters may be compared with multiple device identification parameters associated with each wireless device of the wireless devices and request types to authenticate the wireless device 302. Similarly one or more output data signals received from the wireless device 304 and the wireless device 306 are authenticated. Thereafter the processing subsystem 308 establishes a connection with all these wireless devices. In an embodiment the processing subsystem 308 may receive a probe request from these wireless devices. The probe request may include information associated with wireless capabilities of the wireless devices. This explained in detail in conjunction with FIG. 10.

The processing subsystem 202 transfers multiple output signals corresponding to the service request to the wireless devices for automated provisioning. These output signals include one or more service configurations for automated provisioning of the wireless devices. These service configurations may be installed in the wireless devices in order to connect with the processing subsystem 202.

Prior to transferring the multiple output signals, the processing subsystem 308 determines whether the service configurations are compatible with the communication parameters. In another way initially the processing subsystem 202 identifies the service configurations from multiple service configurations pre-stored. These service configurations may be pre-stored by a network administrator. Here the processing subsystem 202 compares each service configuration with a communication parameter associated with each wireless device. Thereafter the service configurations that are compatible are identified. Subsequently the service configurations are sent as part of the multiple output signals to the wireless devices. The service configurations are explained in conjunction with FIG. 2.

In an embodiment of the invention, the processing subsystem 202 may be configured to notify the wireless devices whether any service configuration compatible with communication parameters associated with the wireless devices. The wireless devices may be notified using any techniques known in the art.

Figure 4:
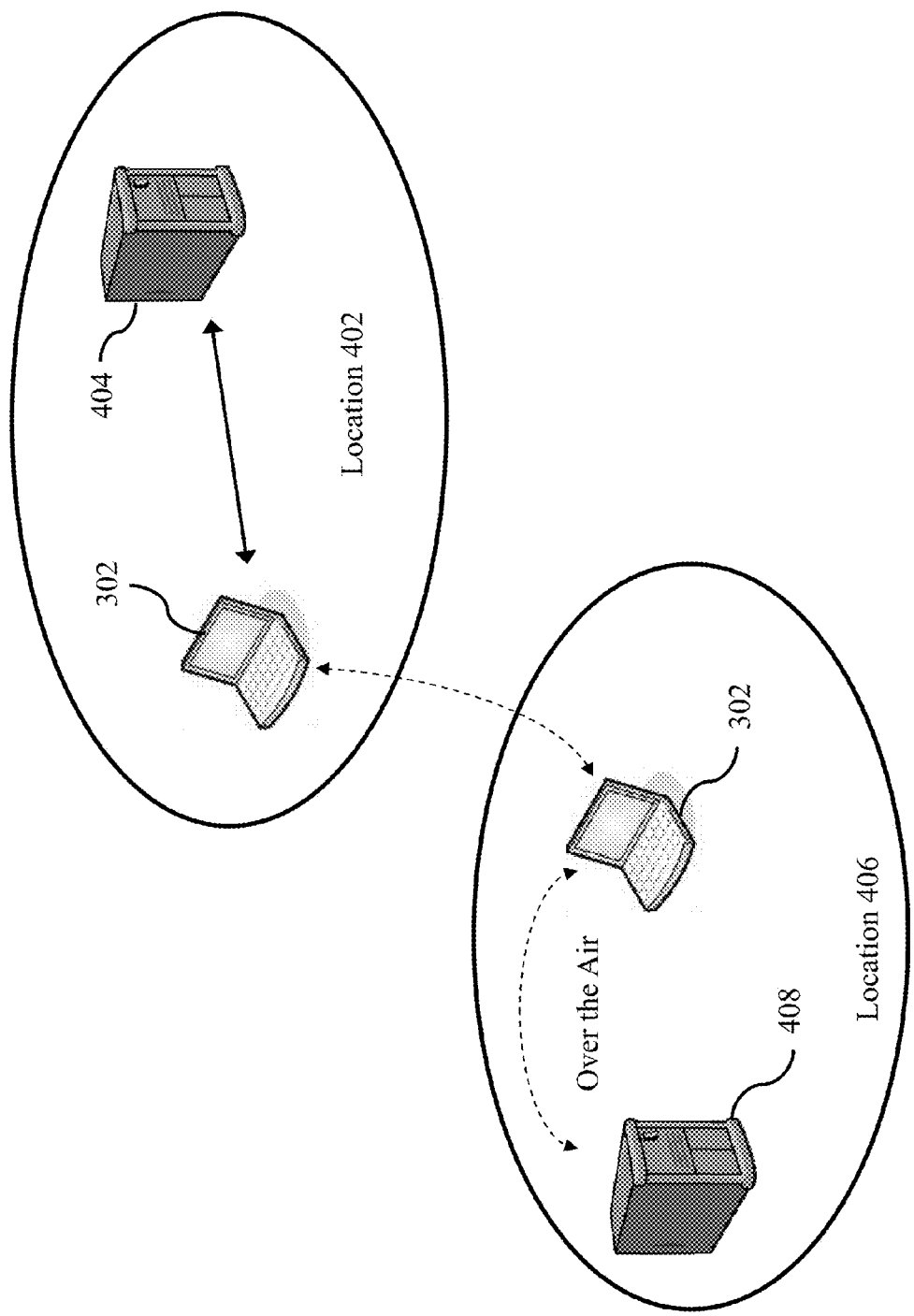
FIG. 4 is a schematic illustration of a wireless device present within the system of FIG. 3 moving from one location to another location in accordance with an embodiment.

Thus a system such as system 300 enables a wireless device entering a location to be automatically provisioned for accessing a secured backend network in the location. For instance the wireless device 302 may be present in a location 402 as illustrated in FIG. 4. The wireless device 302 may be capable of accessing a service provided by a server 404 and may move to a location 406. The server 404 includes a processing subsystem similar to the processing subsystem 202 as described in conjunction with FIGS. 2 and 3. The wireless device 302 may be initially provisioned to have a communication with the server 404 by the processing subsystem. In the location 406 the wireless device 302 needs to be provisioned to access a service provided by a server 408. The server 404 may also include a processing subsystem similar to the processing subsystem 202. The wireless device 302 may be automatically provisioned over the air upon entering the location 406 by the processing subsystem. In an embodiment a single server including the processing subsystem may be capable of automatically provisioning the wireless device 302 in the location 402 and location 406. As a result the wireless device 302 may be conveniently connected to the server 408 in an efficient manner.

Figure 5:
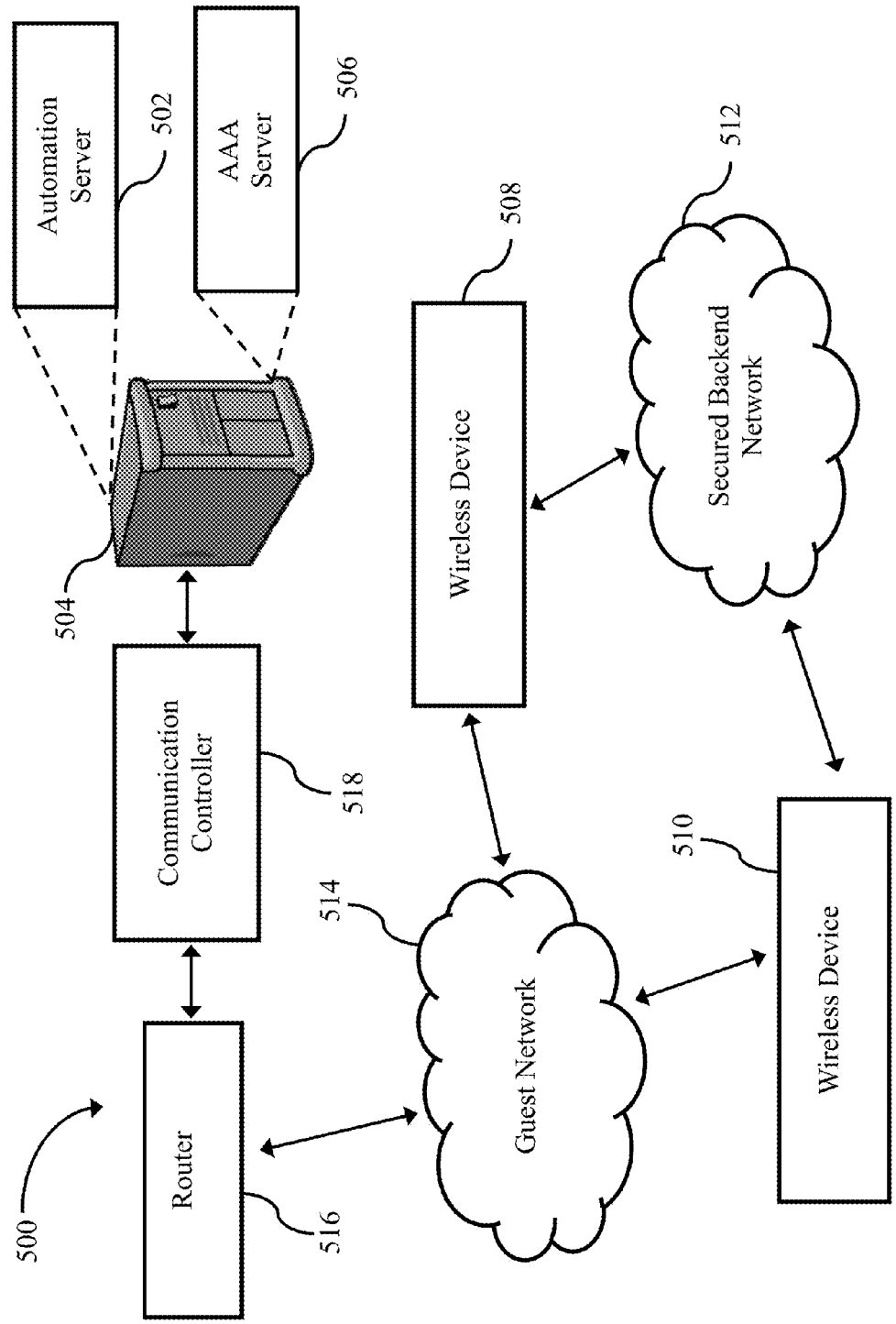
FIG. 5 is a schematic illustration of an exemplary operating environment in which an automation server for automated provisioning of one or more wireless devices may operate in accordance with an embodiment.

An exemplary operating environment 500 in which an automation server 502 for automated provisioning of one or more wireless devices may operate is schematically illustrated in FIG. 5. The exemplary operating environment 500 includes a server 504 comprising the automation server 502 and an Authentication, Authorization and Accounting (AAA) server 506. The automation server 502 represents a processing subsystem such as the processing subsystem 200 described in conjunction with FIGS. 2 and 3. Thus the automation server 502 performs all the processes as performed by the processing subsystem 200. The automation server 502 and the AAA server 506 may be located in different physical server machines. The automation server 502 may be configured to automate the provisioning of one or more wireless devices such as, a wireless device 508 and a wireless device 510. The one or more wireless devices may be automatically provisioned in order to access a secured backend network 512. The secured backend network 512 may be but not limited to, a hospital network, a bank network and a private network.

To be provisioned, the wireless devices may transmit a request to connect to the automation server 504. The request may be transmitted when the wireless devices are in the vicinity of a network 514. The network 514 may be guest or generic or open network. A network topology of the exemplary operating environment 500 may be arranged in a manner that the network 514 is isolated from the secured backend network 512. The request is initially received at a router 516 and then transmitted to a communication controller 518. The router 516 may have wired and wireless communication capabilities. The wireless technologies that may be used by the router 516 may be for example, 802.11 WLAN, Bluetooth®, Zigbee®, WMTS etc. The communication controller 518 may be similar to the communication controller 308 explained in FIG. 3. The communication controller 518 receives the request and then allocates one or more SSIDs to the wireless devices. For example, the wireless device 508 and the wireless device 510 may be allocated different SSIDs available with the communication controller 518. The SSIDS may be associated with the network 514. An SSID may be one of a generic SSID, an open SSID and a guest SSID. The connection between the wireless devices and the communication controller 518 is established when the SSIDs are allocated.

The wireless devices then send one or more output data signals to the automation server 502 through the communication controller 518. Here the output data signals are transmitted through the router 516 and the communication controller 518 in order to be received at the automation server 502. The output data signals include multiple service connection parameters associated with the wireless devices. The service connection parameters may include one or more device identification parameters and a request type. The device identification parameters may be for example a unique device identification key, a hash key, a device serial number, a device Media Access Control (MAC) Address etc. The hash key may be obtained from the device serial number and the device MAC address using a hashing algorithm. Further the request type indicates a service that the wireless device requires. This is explained in detail in conjunction with FIG. 3.

The automation server 502 authenticates the output data signals with pre-stored data. The pre-stored data may be stored in the server 504. In an embodiment the pre-stored data may be stored in an external database connected to the server 504. The pre-stored data may include multiple device identification parameters associated with a plurality of wireless devices, and request types. The pre-stored data is similar to the pre-stored data explained in conjunction with FIGS. 2 and 3. In an embodiment the AAA server 506 may perform other authentication processes known in the art for authenticating the output data signals. The AAA server 506 may perform authentication based on a type of security associated with the network 514. In this scenario the type of security may be an Enterprise based Wireless Security. In response to authentication the automation server 502 establishes a connection with the wireless devices. Thereafter the automation server 502 transfers one or more service configurations to the wireless devices.

Prior to transferring the multiple output signals, the output signals are processed by determining whether the service configurations are compatible with the communication parameters. In another way initially the automation server 502 identifies the service configurations from multiple service configurations pre-stored. The multiple service configurations may be pre-stored in the server 504 by a network administrator. The automation server 502 compares each service configuration with a communication parameter associated with each wireless device. Thereafter the service configurations that are compatible are identified. This eliminates the possibility of using an incorrect service configuration that may usually get selected while manually configuring a service configuration in a wireless device thereby reducing the delay time.

Subsequently, the service configurations are transferred as part of the multiple output signals to the wireless devices. The service configurations are received and automatically installed in the wireless devices to provision the wireless devices to connect to the secured backend network 512. Thus when a wireless device is moved from one location to another then the wireless device may be automatically provisioned to access a secured backend network of a facility in the new location. These eliminate a need of a person or a network administrator to manually provision or configure a service configuration in the wireless device for accessing the secured backend network.

Explaining by way of an example, a wireless device 508 and the wireless device 510 may send requests to an automation server to establish a connection with a secured backend network provided by a healthcare facility. Such requests may be sent when the wireless device 508 and the wireless device 510 are located within a network of the healthcare facility. In this case the wireless devices 508 and the wireless device 510 may be, for example, healthcare equipment. The connection between the wireless device 508 and the automation server may be established using a generic SSID. Whereas the connection between the wireless device 510 and the automation server may be established using a guest SSID. Once the connections are established the automation server sends service configurations to the wireless device 508 and the wireless device 510 based on a communication capability associated these wireless devices. These service configurations are automatically configured in the wireless device 508 and the wireless device 510 for establishing a connection with the secured backend network. Thereafter the wireless device 508 and the wireless device 510 may use services offered by the secured backend network.

FIG. 6 is a schematic illustration of a data flow diagram 600 for automated provisioning of a wireless device in accordance with an embodiment. The data flow diagram 600 depicts the flow of requests between a wireless device 602, a network 604, an automation server 606, an AAA Server 608 and a secured backend network 610. As shown in the data flow diagram 600 initially the wireless device 602 may establish a connection by sending a request 612 to the network 604 using a SSID. The SSID may be a generic SSID, a guest SSID and an open SSID. In an embodiment an SSID and other credentials for connecting to the guest network 604 may be available to the wireless device 602. So when the wireless device 602 enters the vicinity of the guest network 602 the SSID along with the credentials may be sent as part of the request 612 to a communication controller (not shown in FIG. 6) for connecting to the network 604. Thus through the communication controller and the network 604 the wireless device 602 may be connected to the automation server 606. The network 604 and the automation server 606 are connected to each other and all communications through this connection may be secure. The connections may be secured using security protocols such as, a Secure Sockets Layer Protocol (SSL) and a Transport Layer Security Protocol (TLS).

The wireless device 602 then sends a service request 614 to the automation server 606. The service request 614 may be sent as a packet data. This may be achieved by encapsulating the service request 614 in various protocols such as but not limited to Transmission Control Protocol (TCP) packets and User Datagram Protocol packets. In an embodiment the service request 614 may have a packet structure as schematically illustrated in FIG. 7. The packet structure may be an application layer packet structure. As illustrated in FIG. 7 the service request 614 may include a device name, a unique device key, a request type, a packet length, a device serial number and a device MAC address. The data transmitted in a service request is explained in detail in conjunction with FIG. 3. These data present in the service request 614 enables the automation server 606 to authenticate the wireless device 602. So the automation server 606 determines whether the wireless device 602 is an authentic wireless device.

Thereafter the automation server 606 sends a service response 616 to the wireless device 602. The service response 616 may be a negative response or a positive response. A positive response indicates that the wireless device 602 is an authentic wireless device and the service request 614 is accepted. The positive response may have a packet structure as schematically illustrated in FIG. 8. The positive response may include the device name, the unique device key, a response type, the packet length and a response ID. For example a response ID may be indicated as a numerical value such as, 0. The response ID indicates that it is a positive response. Further the response type indicates the kind of response sent to the wireless device 602. In this case the response type indicates that it is a service response. When the service response 616 is positive the automation server 606 establishes the connection with the wireless device 602. The connection may be a secure connection using security protocols such as but not limited to, a SSL protocol and a TLS protocol. The information associated with the security protocols used may be sent to the automation server 606 using a signal 618 by the wireless device 602. Thereafter information associated with the wireless device 602 may be stored in the automation server 606. The information may be but not limited to the device name, the unique device key, the request type, the device serial number and the device MAC address received as part of the service request 614.

Figure 9:
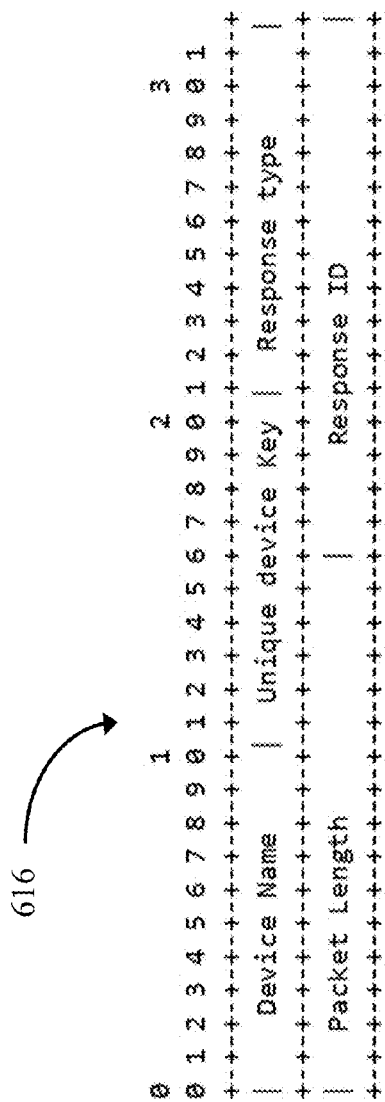
FIG. 9 is a schematic illustration of a packet structure of a service response (a negative response) sent by the automation server to the wireless device in accordance with an embodiment.

Now whereas a negative response indicates that the wireless device 602 is not an authentic wireless device and the service request 614 is not accepted. Thereafter the connection with the wireless device 602 may be automatically disconnected. The negative response may have a packet structure as schematically illustrated in FIG. 9. The negative response may include the device name, the unique device key, a response type, the packet length and a response ID. The response ID indicates that it is a negative response. For example a response ID may be indicated as a numerical value such as, 1. Further the response type indicates a kind of response sent to the wireless device 602. In this case the response type indicates that it is a service response.

Figure 10:
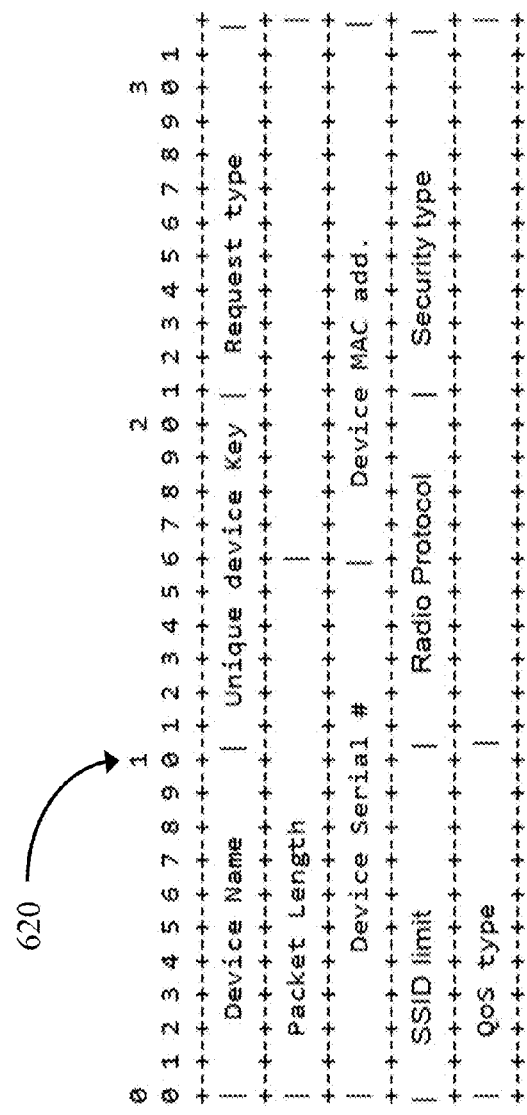
FIG. 10 is a schematic illustration of a packet structure of a probe request sent by the wireless device in accordance with an embodiment.

When a secure connection is established between the wireless device 602, the wireless device 602 sends a probe request 620 to the automation server 606. The probe request 620 may include information regarding wireless capabilities of the wireless device 602 and a request for a service configuration to connect to the secured backend network 610. The service configuration requested may be a configuration compatible to the wireless capabilities of the wireless device 602. A packet structure of the probe request 620 is as schematically illustrated in FIG. 10. The packet structure includes, but is not limited to, device name, the unique device key, a request type, a packet length, the device serial number, the device MAC address, a SSID limit, a radio protocol, a security type and a Quality of Service (QoS) type.

The SSID may be a generic SSID, a guest SSID and an open SSID as described earlier in conjunction with FIG. 2. The radio protocol may be entered as an enum value to indicate that wireless device 602 may support different communication protocols for wireless communication. The security type provides information regarding various security features supported or present in the wireless device 602. The security type may be included as an enum value in the packet structure of the service request 620. Further different QoS techniques supported by the wireless device 602 may be indicated by the QoS type.

The automation server 606 receives the probe request 620 and pre-processes the information in the packet structure as schematically illustrated in FIG. 10. The automation server 606 may perform some check operations to identity whether the wireless device 602 is capable of supporting wireless communication and using an existing wireless infrastructure, and whether a compatible service configuration is present for the wireless device 602. While performing these check operations the automation server 606 compares the information present in the probe request 620 with capabilities of the existing the wireless infrastructure and multiple service configurations available with the automation server 606 to identify a compatible service configuration.

Thereafter the automation server 606 sends a probe response such as, a probe response 622 to the wireless device 602. The probe response 622 may be sent based on whether the wireless device 602 supports wireless features provided by the existing wireless infrastructure. So if the radio protocol, the security type, a frequency band and the Quality of Service (QoS) type matches with a radio protocol, a security type, a frequency band and a Quality of Service (QoS) type of the existing wireless infrastructure then the probe response 622 is sent. The probe response 622 may be sent along with a service configuration that needs to be configured in the wireless device 602. The service configuration once configured will enable the wireless device 602 to access the secured backend network 610.

The probe response 622 may have a packet structure as schematically illustrated in FIG. 11. The packet structure as shown in FIG. 11 includes the device name, the unique device key, a response type, a packet length, a response ID, a SSID, a passphrase, a radio, a security type, a QoS type, Reserved (RSVD), a radius certificate and QoS parameters. The response type indicates that the response is a probe response. The response ID may be indicated as "Pass" representing that the automation server 606 accepted the wireless device 602 and the service configuration is transferred along with the probe response 622.

The SSID and the passphrase may be associated with the secure backend network 610. The SSID and passphrase may be required by the wireless device 602 to access the secured backend network 610. The radio included in the packet structure may indicate a protocol and a frequency band code associated with the secured backend network 610. Further the security type and the QoS type represents a security protocol and a QoS parameter associated with the secured backend network 610. The QoS parameters may be determined based on the QoS type associated with the secured backend network 610. The QoS parameters may include for example but are not limited to, throughput, jitter, dropping of packets, latency, errors, out-of-order delivery, bit error rate. Further the QoS types may include but are not limited to Wi-Fi Multimedia, 802.11e, Legacy QoS and Differentiated Services Code Point (DSCP) based QoS. The Remote Authentication Dial In User Service (RADIUS) certificate indicates a networking protocol supported by the secured backend network 610. The AAA server 608 may authenticate the wireless device 602 based this certificate. A security type associated with the secured backend network 610 may define whether the AAA server 608 needs to authenticate the wireless device 602. The security type in this scenario may be an Enterprise based wireless security. However it may be appreciated that other networking protocols may be supported by a secured backend network such as, the secured backend network 610. In this scenario a certificate associated with the networking protocol may be included in the packet structure of the probe response.

Figure 12:
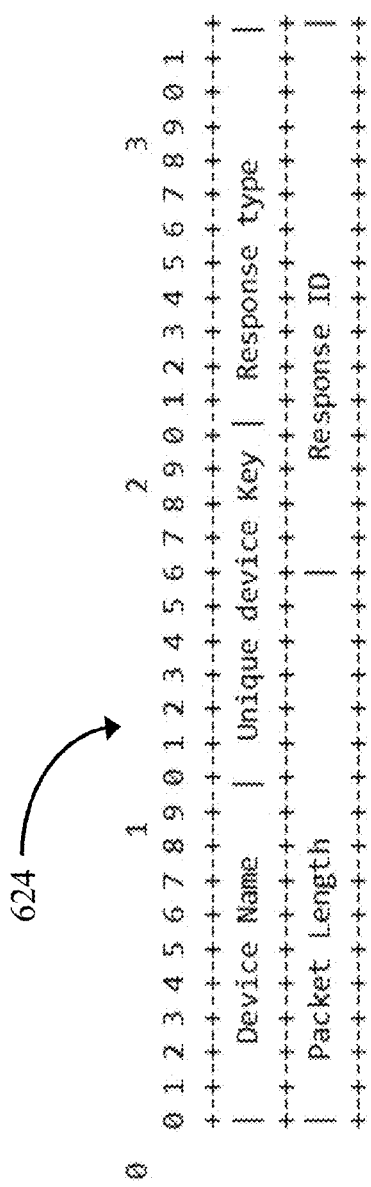
FIG. 12 is a schematic illustration of a packet structure of a probe response (a negative response) sent by the automation server to the wireless device in accordance with an embodiment.

If the automation server 606 finds that the wireless device 602 does not support the wireless capabilities associated with the existing wireless infrastructure then the automation server 606 sends a probe response such as probe response 624 as a negative response. In this case the probe response 624 may have a packet structure as schematically illustrated in FIG. 12. Thus the packet structure may include a response ID indicating as "Fail" in addition to other information such as, the device name and the unique device key associated with the wireless device 602, and a response type. The response type indicates that this probe response associated with the probe request received from the wireless device 602.

Figure 13:
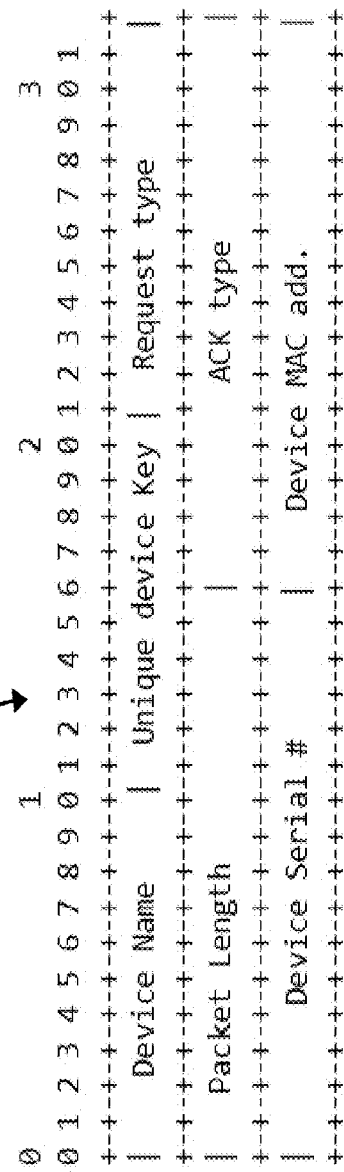
FIG. 13 is a schematic illustration of a packet structure of an acknowledgement request sent by the wireless device to the automation server in accordance with an embodiment.

The wireless device 602 receives the probe response and sends an acknowledgment response 626 to the automation server 606. The wireless device 602 may analyze the probe response 622 to determine whether information present in the probe response 622 is correct. During this analysis the wireless device 602 may also check whether the service configuration received from the automation server 606 is compatible with the wireless communication capabilities of the wireless device 602. If the service configuration and the information present in the probe response 622 are found correct then the acknowledgment response 626 is sent. The acknowledgment response 626 may have a packet structure as schematically illustrated in FIG. 13. The acknowledgment response 626 as illustrated includes the device name, the unique device key, a request type, an ACK type, a packet length, the device serial number and the device MAC address. The request type indicates that this an acknowledgement to the probe response 622 received. Further the ACK type may indicate whether the response from the wireless device 602 is a positive response or a negative response. The positive response represents that the wireless device 602 identified the probe response 622 as correct and the service configuration will be configured in the wireless device 602. The positive response may be represented by enum value '0'. Whereas the negative response represents that the probe response 622 is identified as incorrect. The negative response may be represented by enum value '1'. However it may be appreciated that the positive and negative responses may be represented in any other manner known in the art.

Once the acknowledgment response 626 is received by the automation server 606, the wireless device 602 is automatically configured with the service configuration to enable the wireless device 602 to initiate a connection 626 with the secured backend network 610. Simultaneously the AAA server 608 may establish a connection 628 with the wireless device 602. Thereafter the wireless device 602 accesses the services provided by the secured backend network 610.

Figure 14:
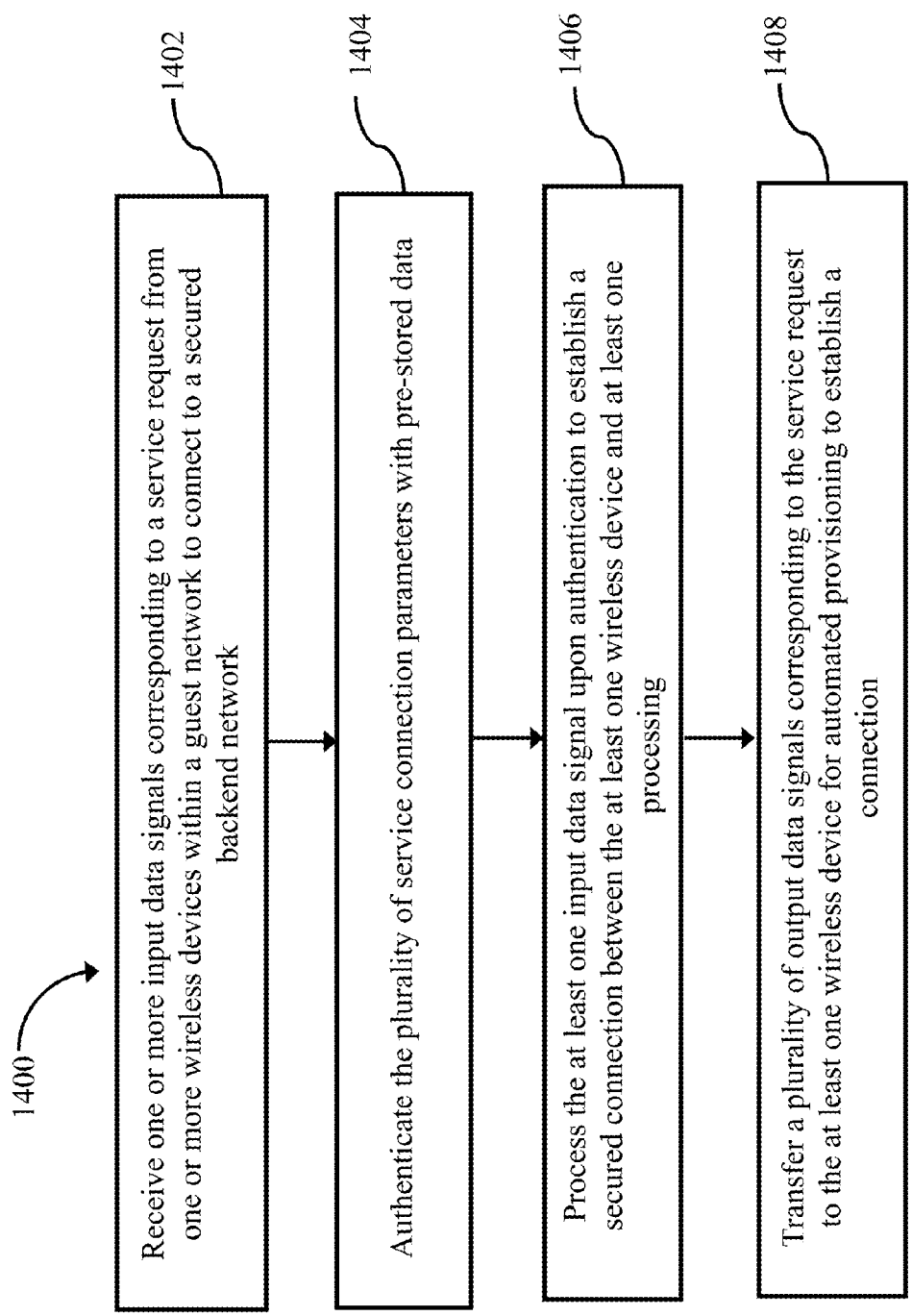
FIG. 14 is a schematic illustration of a method for automated provisioning of one or more wireless devices in accordance with an embodiment.

FIG. 14 illustrates a method 1400 for automated provisioning of one or more wireless devices in accordance with an embodiment. In this method initially one or more input data signals corresponding to a service request are received from the wireless devices at step 1402. The input data signals may include multiple service connection parameters associated with the wireless devices. The service connection parameters may include one or more device identification parameters and a request type. The device identification parameters may be for example a unique device identification key, a device serial number, a device Media Access Control (MAC) Address etc. Further the request type indicates a service that the wireless device requires. The service is for connecting the wireless device to the secured backend network. In an embodiment a service connection parameter may be length of an input data signal.

Further in an embodiment of the invention, the input data signals may include one or more communication parameters associated with the wireless devices. A communication parameter may be associated with communication capability of a wireless device. The wireless devices may be located within the guest network. The input data signals may be received by one or more processing subsystems through the guest network. The service request may be for connecting to a secured backend network. The secured backend network may include for example but are not limited to a hospital network, a bank network and a private network. The wireless devices may need to connect to the secured backend network to access some of the services by the network.

The service connection parameters are authenticated with pre-stored data at step 1404. The pre-stored data includes multiple device identification parameters associated with the wireless devices, and request types. For instance one or more service connection parameters received from a wireless device include unique device identification key, a device serial number, a communication parameter and a device MAC address associated with the wireless device. These service connection parameters may be compared with multiple device identification parameters associated with each wireless device of multiple wireless devices and request types to authenticate the wireless device.

Once the wireless devices are authenticated, the input data signals are processed to establish a secure connection between the wireless devices and the one or more processing subsystems at step 1406. The process of the establishing the secure connection is explained in detail in conjunction with FIGS. 2, 3, 5 and 6.

Thereafter at step 1408 multiple output signals corresponding to the service request is transferred to the wireless devices for automated provisioning to establish a connection with the secured backend network. The output signals include one or more service configurations for automated provisioning of the wireless devices. The service configurations may identified by the one or more processing subsystems from multiple service configurations.

In order to identify the service configurations the one or more processing subsystems may determine whether the service configurations are compatible with the one or more communication parameters associated with the wireless devices. The processing subsystems may be configured to notify the wireless devices whether the service configurations are compatible with the one or more communication parameters. This explained in detail in conjunction with FIG. 2. The service configurations may be received and automatically configured in the wireless devices. Consequently the wireless devices may be connected to the secured backend network. Thus method 1400 enables the wireless devices to be automatically configured to access any network while being mobile without the need of a network administrator.

The method 1400 can be performed using a processor or any other processing device. The method steps can be implemented using coded instructions (e.g., computer readable instructions) stored on a tangible computer readable medium. The tangible computer readable medium may be for example a flash memory, a read-only memory (ROM), a random access memory (RAM), any other computer readable storage medium and any storage media. Although the method of managing an infrastructure in a virtual environment are explained with reference to the flow chart of FIG. 14, other methods of implementing the method can be employed. For example, the order of execution of each method steps may be changed, and/or some of the method steps described may be changed, eliminated, divide or combined. Further the method steps may be sequentially or simultaneously executed for automated provisioning of one or more wireless devices in a network infrastructure.

This written description uses examples to disclose the invention, including the best mode, and also to enable any person skilled in the art to practice the invention, including making and using any computing system or systems and performing any incorporated methods. The patentable scope of embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A processor for automated provisioning of at least one wireless device, the processor comprising:
   at least one memory; and
   at least one server communicably coupled to a guest network that does not provide a path to a separate secured backend network, wherein the at least one server is configured to:
   receive at least one input data signal corresponding to a service request from the at least one wireless device within the guest network, wherein the service request is a request to connect to the secured backend network, wherein the at least one input data signal comprises a plurality of service connection parameters and one or more data communication parameters associated with the at least one wireless device;
   authenticate the plurality of service connection parameters with data prestored in the at least one memory by:
   identifying service configurations for automatic provisioning of the at least one wireless device selected from multiple pre-stored service configurations; and
   comparing each identified service configuration with the one or more data communication parameters sent from the at least one wireless device to identify compatible service configurations;
   process the at least one input data signal upon authentication to establish a secured communication link with the at least one wireless device within the guest network; and transfer a plurality of output signals, including the compatible service configurations, corresponding to the service request to the at least one wireless device in the guest network for automated provisioning without user intervention to establish a connection with the secured backend network.

2. The processor of claim 1, wherein the plurality of service connection parameters comprises at least one device identification parameter and a request type.

3. The processor of claim 2, wherein the pre-stored data comprises a plurality of device identification parameters associated with the at least one wireless device and request type.

4. The processor of claim 1, wherein the one or more communication parameters are associated with a wireless communication capability of the at least one wireless device.

5. The processor of claim 4, wherein the at least one server is further configured to process the at least one input signal by determining whether the at least one communication parameter of the at least one wireless device is compatible with at least one service configuration comprised in the plurality of output signals.

6. The processor of claim 5, wherein the at least one server is further configured to identify the at least one service configuration from a plurality of service configurations.

7. The processor of claim 5, wherein the at least one server is further configured to notify whether the at least one service configuration is compatible with the at least one communication parameter to the at least one wireless device.

8. A system for automated provisioning, the system comprising:
at least one wireless device configured to transmit at least one output data signal corresponding to a service request within a guest network that does not provide a path to a separate secured backend network, wherein the at least one output data signal comprises a plurality of service connection parameters associated with the at least one wireless device; and
a processor having a server configured to:
receive the at least one output data signal corresponding to the service request from the at least one wireless device, wherein the service request is a request to connect to the secured backend network wherein the at least one input data signal comprises a plurality of service connection parameters and one or more data communication parameters associated with the at least one wireless device;
authenticate the plurality of service connection parameters with data prestored in when at least one memory by:
identifying service configurations for automatic provisioning of the at least one wireless device selected from multiple pre-stored service configurations; and
comparing each identified service configuration with the one or more data communication parameters sent from the at least one wireless device to identify compatible service configurations;
process the at least one output data signal upon authentication to establish a secured communication link with the at least one wireless device within the guest network; and
transfer a plurality of output signals, including the compatible service configurations, corresponding to the service request to the at least one wireless device in the guest network for automated provisioning without user intervention to establish a connection with the secured backend network.

9. The system of claim 8, wherein the plurality of service connection parameters comprises at least one device identification parameter and a request type.

10. The system of claim 9, wherein the pre-stored data comprises a plurality of device identification parameters associated with the at least one wireless device and request types.

11. The system of claim 8, further comprising a communication controller communicably connected to the server, wherein the communication controller is configured to:
receive a request from the at least one wireless device for connecting to the communication controller over the guest network, wherein the connection between the communication controller and the at least one wireless device is different from a connection between the communication controller and the server; and
process the request to establish a connection between the at least one wireless device and the server through the communication controller.

12. The system of claim 11, wherein the communication controller is configured to assign one of a generic Service Set Identification (SSID), an open SSID and a guest SSID to at least one wireless device to establish the connection between the at least one wireless device and the server, wherein at least one of the generic SSID, the open SSID and the guest SSID is associated with the guest network.

13. The system of claim 8, wherein the at least one data communication parameter is associated with a wireless communication capability of the at least one wireless device.

14. The system of claim 13, wherein the server is further configured to:
process the at least one output data signal by determining whether at least one service configuration comprised in the plurality of output signals is compatible with the at least one communication parameter; and
notify whether the at least one service configuration is compatible with the at least one communication parameter to the at least one wireless device.

15. The system of claim 14, wherein the server is further configured to identify the at least one service configuration from a plurality of service configurations.

16. A method of automated provisioning of at least one wireless device, the method comprising:
receiving at least one input data signal corresponding to a service request from the at least one wireless device within a guest network that does not provide a path to a separate secured backend network, wherein the service request is a request to connect to the secured backend network, wherein the at least one input data signal comprises a plurality of service connection parameters and one or more data communication parameters associated with the at least one wireless device;
authenticating the plurality of service connection parameters with pre-stored data by:
identifying service configurations for automatic provisioning of the at least one wireless device selected from multiple pre-stored service configurations; and
comparing each identified service configuration with the one or more data communication parameters sent from the at least one wireless device to identify compatible service configurations;
processing the at least one input data signal upon authentication to establish a secured communication link between the at least one wireless device within the guest network and at least one processing sub-system; and transferring a plurality of output signals, including the compatible service configurations, corresponding to the service request to the at least one wireless device in the guest network for automated provisioning without user intervention to establish a connection with the secured backend network.

17. The method of claim 16, wherein processing the at least one input signal further comprises:
determining whether at least one service configuration comprised in the plurality of output signals is compatible with the at least one communication parameter of the at least one wireless device comprised in the at least one input signal; and
notifying whether the at least one service configuration is compatible with the at least one communication parameter to at least one wireless device.

* * * * *